US008742930B2

(12) United States Patent
Hong et al.

(10) Patent No.: US 8,742,930 B2
(45) Date of Patent: Jun. 3, 2014

(54) GATE SYSTEM

(75) Inventors: Jin Kuk Hong, Hwaseong (KR); Jeong Ki Ryoo, Daejeon (KR); Jae Yul Choo, Yongin (KR); Hyung Jun Jeon, Hwaseong (KR)

(73) Assignee: LS Industrial Systems Co., Ltd., Anyang-Si, Gyeonggi-Do (KR)

( * ) Notice: Subject to any disclaimer, the term of this patent is extended or adjusted under 35 U.S.C. 154(b) by 231 days.

(21) Appl. No.: 13/046,604

(22) Filed: Mar. 11, 2011

(65) Prior Publication Data

US 2011/0227701 A1 Sep. 22, 2011

(30) Foreign Application Priority Data

Mar. 17, 2010 (KR) ........................ 10-2010-0023806

(51) Int. Cl.
*G08B 13/14* (2006.01)
*G05B 19/00* (2006.01)

(52) U.S. Cl.
USPC .................... 340/572.7; 340/10.1; 340/572.2; 340/5.61

(58) Field of Classification Search
CPC ................................ G08B 13/14; G05B 19/00
USPC .............. 340/10.1–10.34, 572.1, 572.7, 5.92, 340/426, 572.2, 5.61; 343/700 MS; 235/375–385
See application file for complete search history.

(56) References Cited

U.S. PATENT DOCUMENTS 4,710,752 A * 12/1987 Cordery ........................ 340/551
5,070,339 A * 12/1991 Chu et al. ............... 343/700 MS
5,327,118 A * 7/1994 Drucker et al. ............ 340/572.7
6,236,315 B1 * 5/2001 Helms et al. ............... 340/572.7
6,307,473 B1 * 10/2001 Zampini et al. ............ 340/572.1
6,825,766 B2 * 11/2004 Hewitt et al. .............. 340/572.7
6,836,216 B2 * 12/2004 Manov et al. .............. 340/572.7
6,958,695 B1 * 10/2005 Imafuku .................... 340/568.1
7,030,750 B2 * 4/2006 Lee ................................ 340/521
7,042,359 B2 * 5/2006 Clucas ....................... 340/572.1

(Continued)

FOREIGN PATENT DOCUMENTS

CN 101223558 7/2008
CN 101443822 5/2009

(Continued)

OTHER PUBLICATIONS

Korean Intellectual Property Office Application Serial No. 10-2010-0023806, Office Action dated May 31, 2011, 3 pages.

(Continued)

*Primary Examiner* — Nam V Nguyen

(74) *Attorney, Agent, or Firm* — Lee, Hong, Degerman, Kang & Waimey

(57) ABSTRACT

Disclosed is a gate system arranged on two gate frames and detects a tag passing between the two gate frames, the gate system including at least two gate frames that are vertically arranged facing with each other; at least two antenna units that are arranged on the at least two gate frames, respectively; and a reader that is arranged on each of the at least two gate frames and enables the at least two antenna units to emit electromagnetic wave to an article passing between the at least two gate frames using a predetermined frequency signal, and obtains information stored in a tag using a signal that the at least two antenna units receives from the at least two antenna units.

9 Claims, 7 Drawing Sheets

(56) References Cited

U.S. PATENT DOCUMENTS

| | | | | |
|---|---|---|---|---|
| 7,075,005 | B1 * | 7/2006 | Drane | 174/50 |
| 7,289,067 | B2 * | 10/2007 | Ohishi | 343/700 MS |
| 7,460,073 | B2 * | 12/2008 | Schillmeier et al. | 343/700 MS |
| 8,040,284 | B2 * | 10/2011 | Teng et al. | 343/702 |
| 2006/0017634 | A1 * | 1/2006 | Meissner | 343/742 |
| 2006/0132312 | A1 * | 6/2006 | Tavormina | 340/572.7 |
| 2006/0170595 | A1 * | 8/2006 | Gustaf | 343/700 MS |
| 2007/0052521 | A1 * | 3/2007 | Beedles et al. | 340/10.1 |
| 2007/0200701 | A1 * | 8/2007 | English et al. | 340/572.1 |
| 2007/0273529 | A1 * | 11/2007 | Lee et al. | 340/572.7 |
| 2009/0091428 | A1 * | 4/2009 | Tuttle | 340/10.2 |
| 2011/0095892 | A1 * | 4/2011 | Hong et al. | 340/572.7 |
| 2011/0234463 | A1 * | 9/2011 | Lankes et al. | 343/728 |
| 2012/0218081 | A1 * | 8/2012 | Blake et al. | 340/10.1 |

FOREIGN PATENT DOCUMENTS

| | | |
|---|---|---|
| JP | 2008-234527 | 10/2008 |
| KR | 10-2009-0121031 | 11/2009 |
| TW | 200847526 | 12/2008 |

OTHER PUBLICATIONS

The State Intellectual Property Office of the People's Republic of China Application Serial No. 201110068376.2, Office Action dated May 9, 2013, 6 pages.

* cited by examiner

GATE SYSTEM

Pursuant to 35 U.S.C. §119 (a), this application claims the benefit of earlier filing date and right of priority to Korean Patent Application No. 10-2010-0023806, filed on Mar. 17, 2010, the contents of which are hereby incorporated by reference in their entirety.

BACKGROUND OF THE DISCLOSURE

1. Field of the Invention

The present disclosure relates to a gate system, and more particularly, to a gate system that has a radio frequency identification (RFID) system of an ultra high frequency band arranged on two gate frames and detects a tag passing between the two gate frames.

2. Description of the Related Art

Generally, a gate system is widely used in an electronic article surveillance system and a burglar detection system at a library.

The gate system commonly includes two gate frames that are vertically arranged at an entrance and an RFID system in the two gate frames.

The RFID system has antenna units arranged on the two gate frames and a reader, the two gate frames each having an antenna unit and the antenna units facing each other.

The gate system enables the reader to periodically apply a predetermined frequency signal to the antenna unit such that the antenna unit generates electromagnetic wave.

When a tag attached to an article passes between the two gate frames, the tag receives the electromagnetic wave generated in the antenna unit where the wave is activated, and transmits prestored information, that is, information on the article.

The antenna unit receives the certain information transmitted by the tag and provides the information for the reader. Further, the reader reads out the information input from the tag through the antenna unit and obtains the information on the article.

Further, recently, the gate system includes a monitoring camera, thereby increasing a tag recognition function. For example, the gate frame includes a monitoring camera arranged therein so that the monitoring camera takes a picture of a passing article, that is, the article attached to a tag. At this time, when an unrecognized tag has passed between the gate frames, the gate system implements a function to update data.

The RFID system mounted in the gate system uses a high frequency (HF) band. Since the RFID system that uses the HF band has a short recognition distance, it can precisely recognize only information on a tag of an article passing between the gate frames and cannot obtain information on tags of articles that are positioned nearby and have not passed between gate frames, so that the gate system operates normally.

Recently, the RFID system included in the gate system uses an ultra high frequency (UHF) band signal.

When the RFID system uses the UHF band signal, a tag recognition distance becomes about 5 cm, so errors often occur where the RFID system recognizes tag information of an article adjacently positioned to the gate frame that has not passed between the gate frames and tag information of an article that has passed between the gate frames.

SUMMARY OF THE INVENTION

The present disclosure provides a gate system capable of precisely recognizing only information of a tag, passing between gate frames while using a UHF band signal, not recognizing tag information of an article positioned adjacently to the gate frames, that has not passed between gate frames, whereby a recognition error does not occur.

According to an aspect of the present disclosure, a gate system includes at least two gate frames that are vertically arranged facing with each other; at least two antenna units that are arranged on the at least two gate frames, respectively; and a reader that is arranged on each of the at least two gate frames and enables the at least two antenna units to emit electromagnetic wave to an article passing between the at least two gate frames using a predetermined frequency signal, and obtains information stored in a tag using a signal that the at least two antenna units receives from the at least two antenna units, wherein each of the at least two antenna units includes: a ground plate; a plurality of unit antennas partly arranged on the ground plate; and an electromagnetic wave absorber that is attached on the ground plate except for an area of the ground plate where the plurality of unit antennas are arranged.

Preferably each of the at least two antenna units includes at least two array antennas, and each of the array antennas includes a ground plate, a plurality of unit antennas partly arranged on the ground plate and an electromagnetic wave absorber that is attached on the ground plate except for an area where the plurality of unit antennas are attached and absorbs the electromagnetic wave.

Preferably the ground plate is formed of a metal material.

Preferably the reader includes at least two readers that apply a predetermined frequency signal to the at least two antenna units arranged on each of the at least two gate frames so as to emit electromagnetic wave.

Preferably the reader is a reader that apply a predetermined frequency signal to the at least two antenna units arranged on each of the at least two gate frames so as to emit electromagnetic wave.

Preferably the reader enables the at least two antenna units arranged in each of the at least two gate frames to emit electromagnetic wave alternately.

Preferably the reader applies an ultra high frequency band signal to the at least two antenna units so as to emit electromagnetic wave.

BRIEF DESCRIPTION OF THE DRAWINGS

The accompanying drawings, which are included to provide a further understanding of the disclosure and are incorporated in and constitute a part of this application, illustrate embodiments of the disclosure and together with the description, serve to explain the principle of the disclosure. In the drawings.

DETAILED DESCRIPTION OF THE PREFERRED EMBODIMENTS

Figure 1:
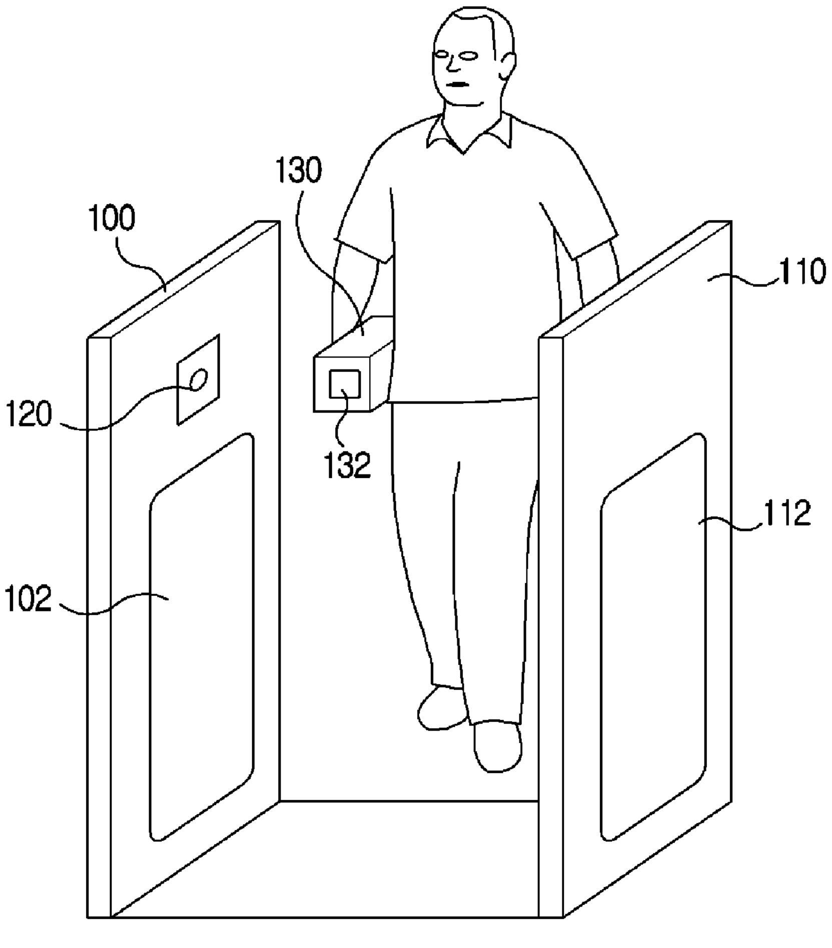
FIG. 1 is a schematic constructional view illustrating a general gate system.

Hereinafter, embodiments of the present disclosure will be described with reference to the accompanying drawings. In this procedure, size and shape of the components shown in the drawings may be exaggerated for the sake of clarity and convenience. Further, terms that are specifically defined in consideration of construction and operation of the present disclosure may be changed according to operator's intention or custom. Definition of such items should be made on the basis of entire contents of the specification.

Hereinafter, a detailed description is an embodiment of the present disclosure only and nothing but an illustration. Further, principle and concept of the present disclosure are provided for the purpose of describing the present disclosure with ease.

Accordingly, a detailed construction that is not necessarily needed to take a basic understanding of the present disclosure is not of course provided and various forms embodied by those skilled in the art in a substance of the present disclosure are illustrated through the drawings FIG. 1 is a schematic constructional view illustrating a general gate system. Reference numerals 100 and 110 denote gate frames, respectively. The gate frames 100 and 110 are vertically arranged to face each other.

Further, the gate frames 100 and 110 have antenna units 102 and 112 arranged to face each other.

Reference numeral 120 denotes a monitoring camera. The monitoring camera 120 is arranged on any one of the gate frames 100 and 110, for example, on the gate frame 100 and then takes a picture of an article 130 having a tag 132 attached thereto that passes between the gate frames 100 and 110.

The gate system having such a construction has a reader (not shown) that generates a predetermined frequency signal and applies it to the antenna units 102 and 112.

Then, the antenna units 102 and 112 generate and emit electromagnetic wave signals according to the predetermined frequency signal.

In such a state, when a purchaser who wishes to purchase a desired article having a tag 132 attached thereto passes between the gate frames 100 and 110, the tag 132 receives electromagnetic wave emitted from the antenna units 102 and 112 and generates energy. The tag 132 normally operates using the energy so that it transmits information of the article 130 that has been stored in advance in the tag.

The antenna units 102 and 112 receive the information of the article 130 that is transmitted by the tag 132 and the information of the article 130 is input to the reader.

Then, the reader analyzes the information of the article 130 input and determines kind and price of the article 130.

Further, when the tag 132 passes between the gate frames 100 and 110, there may be a case that the tag 132 does not operate normally and the reader can not obtain information.

Therefore, the monitoring camera 120 takes a picture of the article 130 having a tag 132 attached thereto that passes between the gate frames 100 and 110, and analyzes information of the article using a taken image of the article 130.

Figure 2:
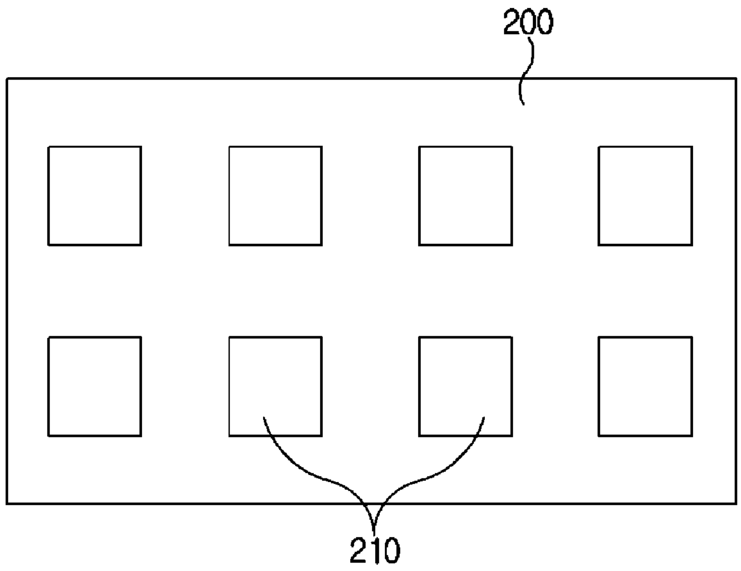
FIG. 2 is a schematic plane view illustrating a construction of an antenna units used in a general gate system.

FIG. 2 is a schematic plane view illustrating antenna units 102 and 112 used in a general gate system. Here, a reference numeral 200 denotes a ground plate made of metal. An upper surface of the ground plate 200 has a plurality of antennas 210 arranged in an array. For example, the plurality of antennas 210 is arranged in a 4×4 array. The plurality of antennas 210 emits electromagnetic wave according to a predetermined frequency signal output by the reader, receives information of the article 130 transmitted by the tag 132 and provides the reader with it.

In such a gate system, the reader generates a high frequency (HF) band signal having a frequency of 13.56 MHz and outputs it to the antenna units 102 and 112. Further, recently, the reader recognizes the tag 132 as the antenna units 102 and 112 enable the antenna units 102 and 112 to emit electromagnetic wave using the ultra high frequency (UHF) band signal.

However, since the antenna units 102 and 112 arranged facing each other have a plurality of antennas 210 in a 4×2 array on the ground plate 200 made of metal, electromagnetic wave emitted from the antenna units 102 and 112 is reflected on the ground plate 200 of the antenna units 102 and 112. Due to the electromagnetic wave reflected on the ground plate 200, an error frequently occurred that a tag 132 positioned adjacently to gate frames 100 and 110 as well as the tag 132 passing between the gate frames 110 and 110 was recognized.

Figure 3:
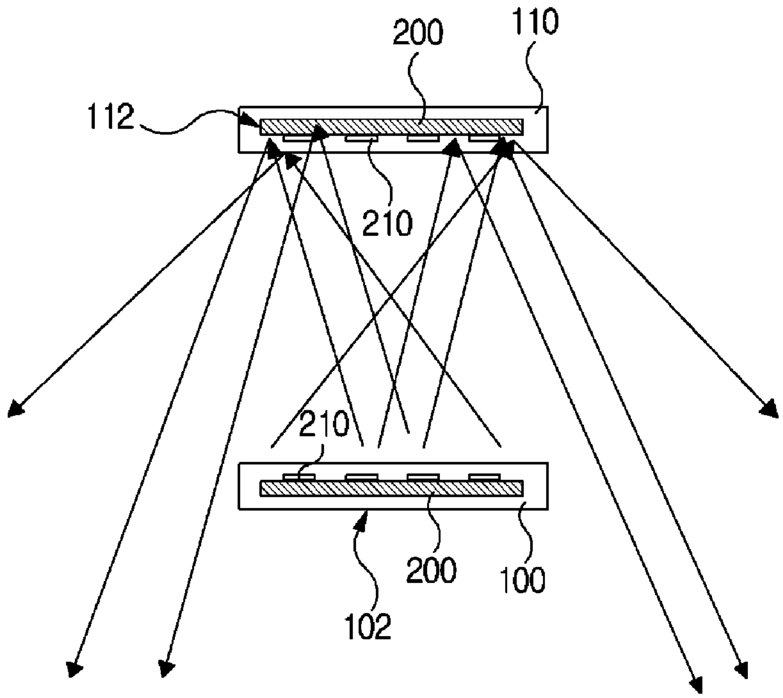
FIG. 3 is a view explaining an intensity of a reflected wave generating in an antenna unit that is used in a general gate system.

For example, as illustrated in FIG. 3, a reflected wave is generated when electromagnetic wave emitted from the antenna 210 of the antenna unit 102 arranged in the gate frame 100 is reflected on the ground plate 200 of the antenna unit 112 arranged in the gate frame 110.

In the case of using the UHF band signal, since intensity of the reflected wave that is reflected on the ground plate 200 is so high that its recognition distance reaches about 5 cm. Therefore, an error frequently occurred that the tag 132 positioned adjacently to the gate frames 100 and 110 other than the tag 132 passing between the gate frames 100 and 110 was recognized.

Figure 4:
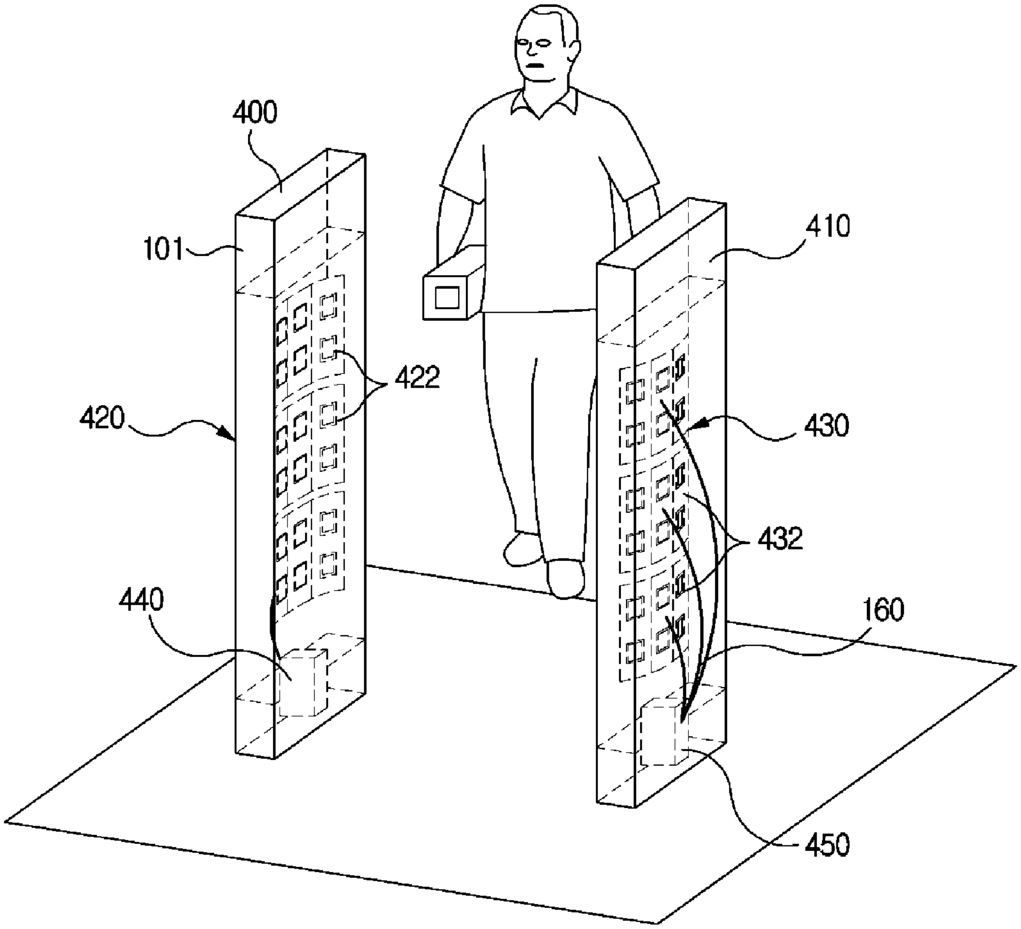
FIG. 4 is a constructional view illustrating a gate system according to a preferred embodiment of a present disclosure.

FIG. 4 is a constructional view illustrating a gate system according to a preferred embodiment of a present disclosure. Here, reference numerals 400 and 410 denote gate frames arranged facing each other. The gate frames 400 and 410 have antenna units 420 and 430 arranged facing each other, and readers 440 and 450 are arranged on the antenna units 420 and 430 to apply a predetermined frequency signal and recognize tag information.

Figure 5A:
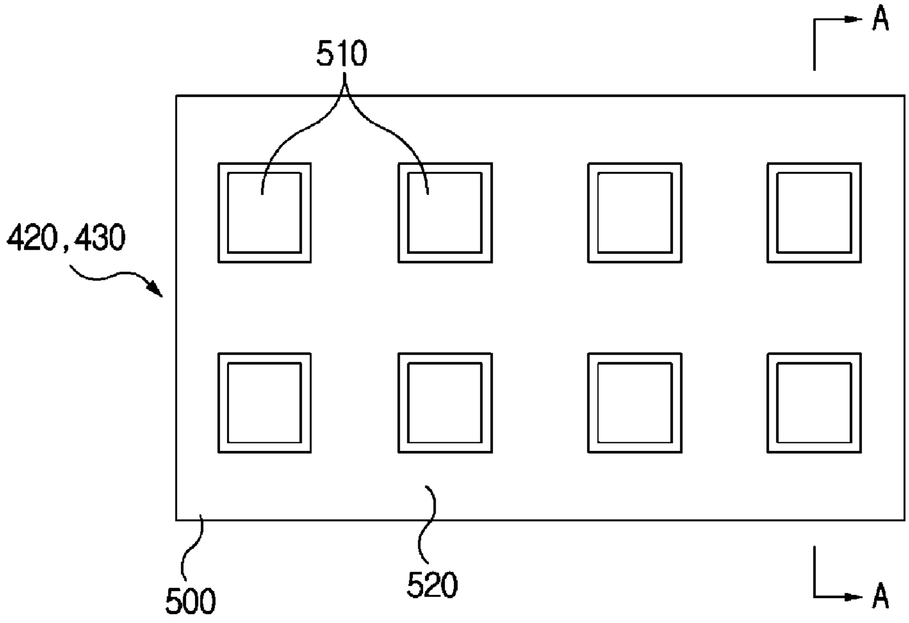
FIGS. 5*a* and 5*b* are a plane view illustrating a construction of an antenna unit used in a gate system according to the present disclosure and a sectional view taken along line A-A, respectively.
Figure 5B:
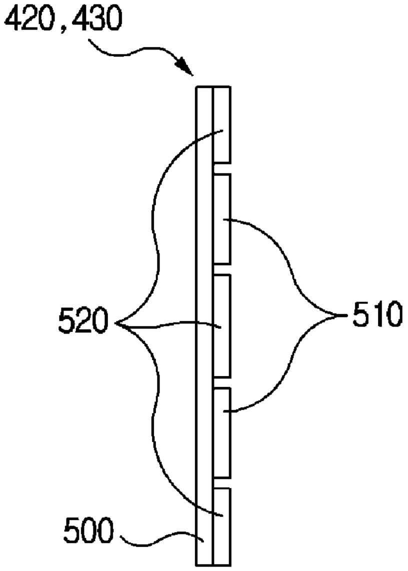

The antenna units 420 and 430 each include a plurality of array antennas 422 and 432, for example. The plurality of array antennas 422 and 432 each include a plurality of unit antenna 510 on the ground plate 500 made of metal arranged as illustrated in FIGS. 5*a* and 5*b*, and an electromagnetic wave absorber 520 arranged on the surface of the ground plate 500 that is exposed externally, except for the area of the ground plate 500 where the plurality of unit antennas are arranged.

When the gate system of the present disclosure constructed as described above recognizes the tag, the readers 440 and 450 generate a predetermined frequency signal and the generated predetermined frequency signal is applied to each of the plurality of unit antennas 510 of the plurality of array antennas 422 and 432 included in the antenna units 420 and 430.

Then, the each of plurality of unit antennas 510 each generates electromagnetic wave according to the applied predetermined frequency signal and emits it in the forward direction.

Here, the generated predetermined frequency signal applied to the plurality of unit antennas 510 of the plurality of array antennas 422 and 432 included in each of the antenna units 420 and 430 using any one of the readers 440 and 450.

Further, in order to reduce recognition error of the tag, when the readers 440 and 450 generate a predetermined frequency signal so that the plurality of unit antennas 510 each emits electromagnetic wave, it is desirable that the plurality of unit antennas 510 of the plurality of array antennas 422 and 432 included in each of the antenna units 420 and 430 emits electromagnetic wave alternately.

For example, when the plurality of unit antennas 510 of the plurality of array antennas 422 included in each of the antenna unit 420 emits electromagnetic wave, the plurality of unit antennas 510 of the plurality of array antennas 432 included in each of the antenna unit 430 does not emit electromagnetic wave. Further, when the plurality of unit antennas 510 of the plurality of array antennas 420 included in each of the antenna unit 430 emits electromagnetic wave, the plurality of unit antennas 510 of the plurality of array antennas 422 included in each of the antenna unit 420 does not emit electromagnetic wave.

Figure 6:
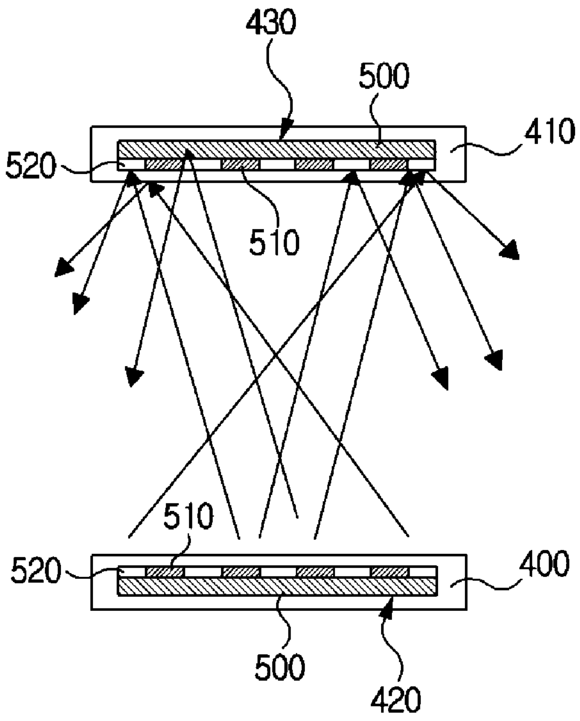
FIG. 6 is a view explaining an intensity of a reflected wave occurring in an antenna unit that is used in a gate system of the present disclosure.

The electromagnetic wave emitted from the plurality of unit antennas 510 advances to the gate frame 400 and 410 positioned ahead. For example, assuming that the plurality of unit antennas 510 of the plurality of array antennas 422 included in each of the antenna unit 420 emits electromagnetic wave as illustrated in FIG. 6, the emitted electromagnetic wave can be propagated to the plurality of array antennas 432 of the antenna unit 430 included in the gate frame 410. In this case, the electromagnetic wave emitted by the plurality of unit antennas of the array antenna 422 may interfere with the electromagnetic wave emitted by the plurality of unit antennas of the array antennas 432. Further, the electromagnetic wave emitted by the array antenna 422 may hit the array antenna 432 and then be reflected on it.

Here, the plurality of array antennas 422 and 432 each has the plurality of unit antennas 510 partly arranged on the ground plate made of metal and an electromagnetic wave absorber 520 attached on the front surface of the ground plate 500 except for an area where the plurality of unit antennas 510 are arranged.

Therefore, most of the electromagnetic wave hit on the plurality of array antennas 430 of the antenna unit 430 included in the gate frames 410 is absorbed by the electromagnetic wave absorber 520, and the readers 440 and 450 detect information of the tag passing between the gate frames 400 and 410 only, not that of the tag 132 positioned adjacently to the gate frames 400 and 410.

Figure 7A:
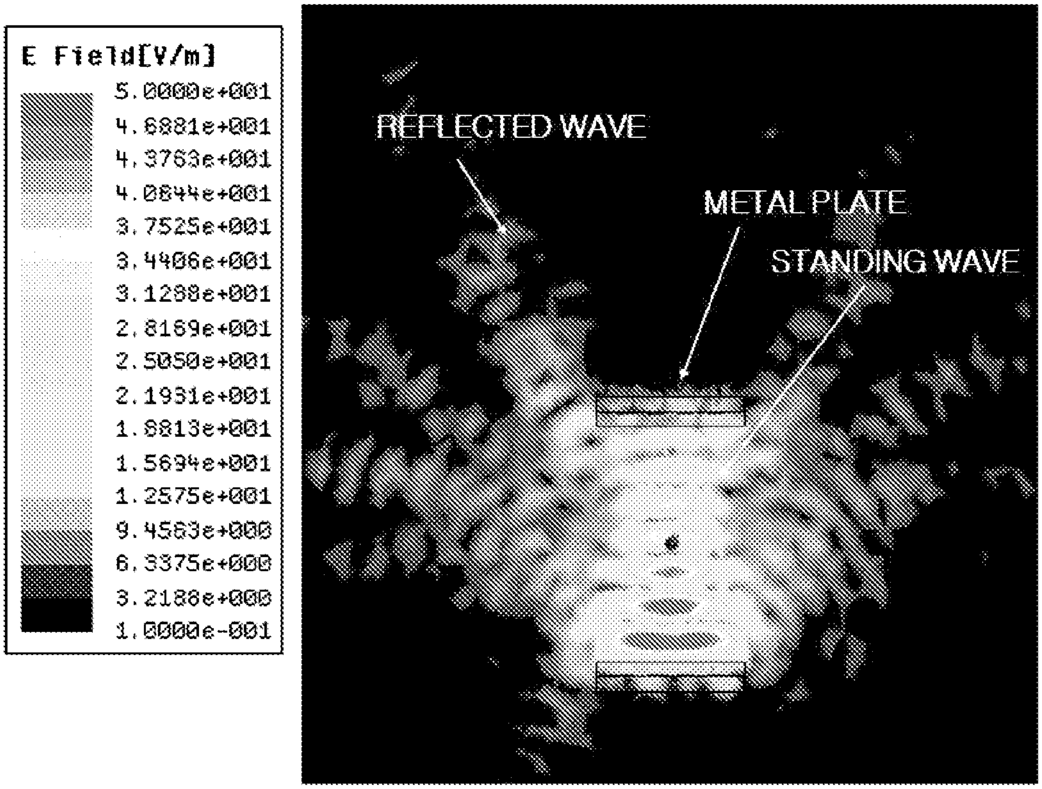
FIGS. 7*a* and 7*b* are views illustrating intensity results of reflected waves occurring in antenna units that are used in a general gate system and a gate system of the present disclosure, respectively.
Figure 7B:
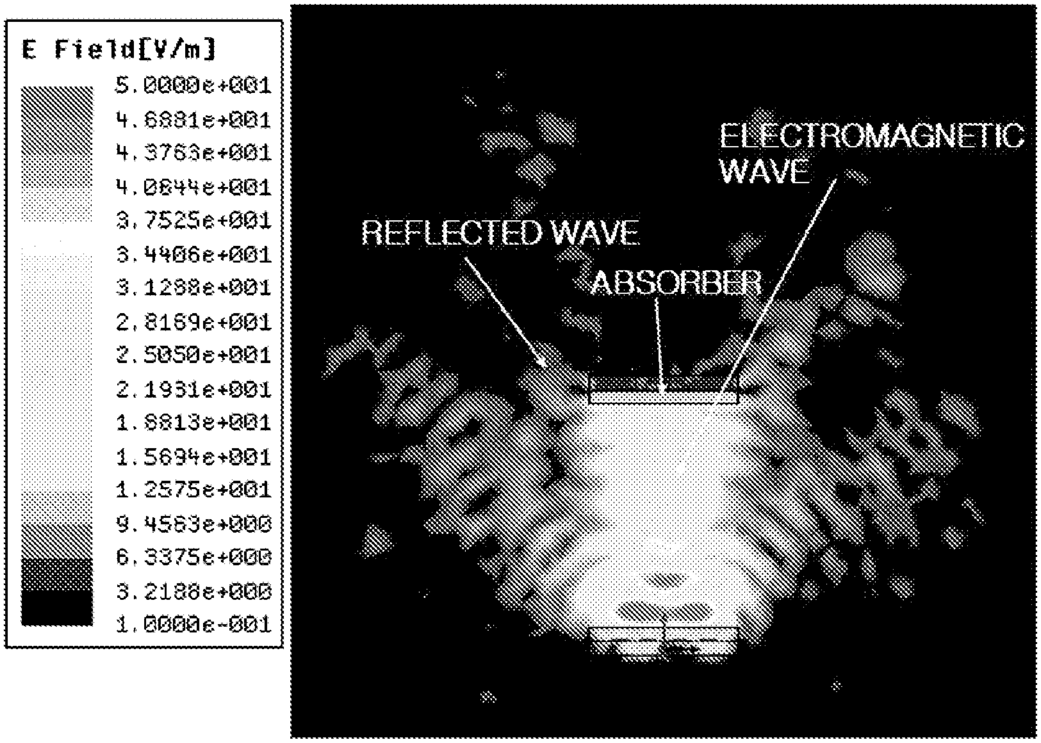

FIGS. 7*a* and 7*b* are views illustrating measured intensities of reflected waves generated in antenna units used in a general gate system and a gate system according to the present disclosure. Referring to FIG. 7*a*, an intensity of electromagnetic wave generated in the antenna units 102 and 112 that are used in a general gate system was very high.

However, in the gate system of the present disclosure, most of the electromagnetic wave emitted as illustrate in FIG. 7*b* is absorbed by the electromagnetic wave absorber 520 and electromagnetic wave of very thin intensity only is emitted.

Accordingly, it may be possible to precisely detect information of the tag passing between the gate frames 400 and 410 and it may not be possible to obtain information of the tag positioned adjacently to the gate frames 400 and 410 that does not pass between the gate frames 400 and 410.

Hereinbefore, while the embodiments of the present disclosure are described, they are exemplary ones only and one of ordinary skill in the art may recognize that various alterations and modifications that fall within the scope of the present disclosure may be possible. Accordingly, the true technical protection scope of the present disclosure should be defined by the following claims.

What is claimed is:

1. A gate system comprising:

first and second gate frames vertically arranged such that they face each other;

a first antenna unit in the first gate frame and a second antenna unit in the second gate frame, the first and second antenna units configured to emit signals; and a reader connected to each of the first and second antenna units and configured to control the first and second antenna units to emit the signals to a tag located on an article passing between the first and second gate frames and to obtain information stored in the tag based on a signal that the first and second antenna units receive from the tag, wherein each of the first and second antenna units includes:

a ground plate having both end portions bent from a center portion of the ground plate at a predetermined angle;

a plurality of unit antennas on a surface of the ground plate, the plurality of unit antennas directly attached to the ground plate; and an absorber on the ground plate, the absorber covering an area of the ground plate on which the plurality of unit antennas is not located.

2. The gate system according to claim 1, wherein the ground plate is formed of a metal material.

3. The gate system according to claim 1, wherein the reader is further configured to control the first and second antenna units to emit the signals by applying a predetermined frequency signal to the first and second antenna units.

4. The gate system according to claim 1, wherein the reader is further configured to enable the tag to receive the signals emitted from the first and second antenna units such that the tag is activated and transmits the information including information related to the article, to the first and second antenna units.

5. The gate system according to claim 4, wherein:

the first and second antenna units are further configured to receive the information related to the article and to provide the reader with the information; and the reader is further configured to obtain the information of related to the article from the information provided by the first and second antenna units.

6. The gate system according to claim 1, wherein, the reader is further configured to prohibit the first or second antenna unit from emitting signals when the other of the first or second antenna unit emits the signal.

7. The gate system according to claim 1, wherein the reader is further configured to control the first and second antenna units to emit the signals by applying an ultra high frequency band signal to the first and second antenna units.

8. The gate system according to claim 1, further comprising a monitoring camera configured to obtain the information related to the article.

9. The gate system according to claim 1, wherein the reader includes a first reader located in the first gate frame and a second reader located in the second gate frame.

* * * * *